Patented Feb. 10, 1925.

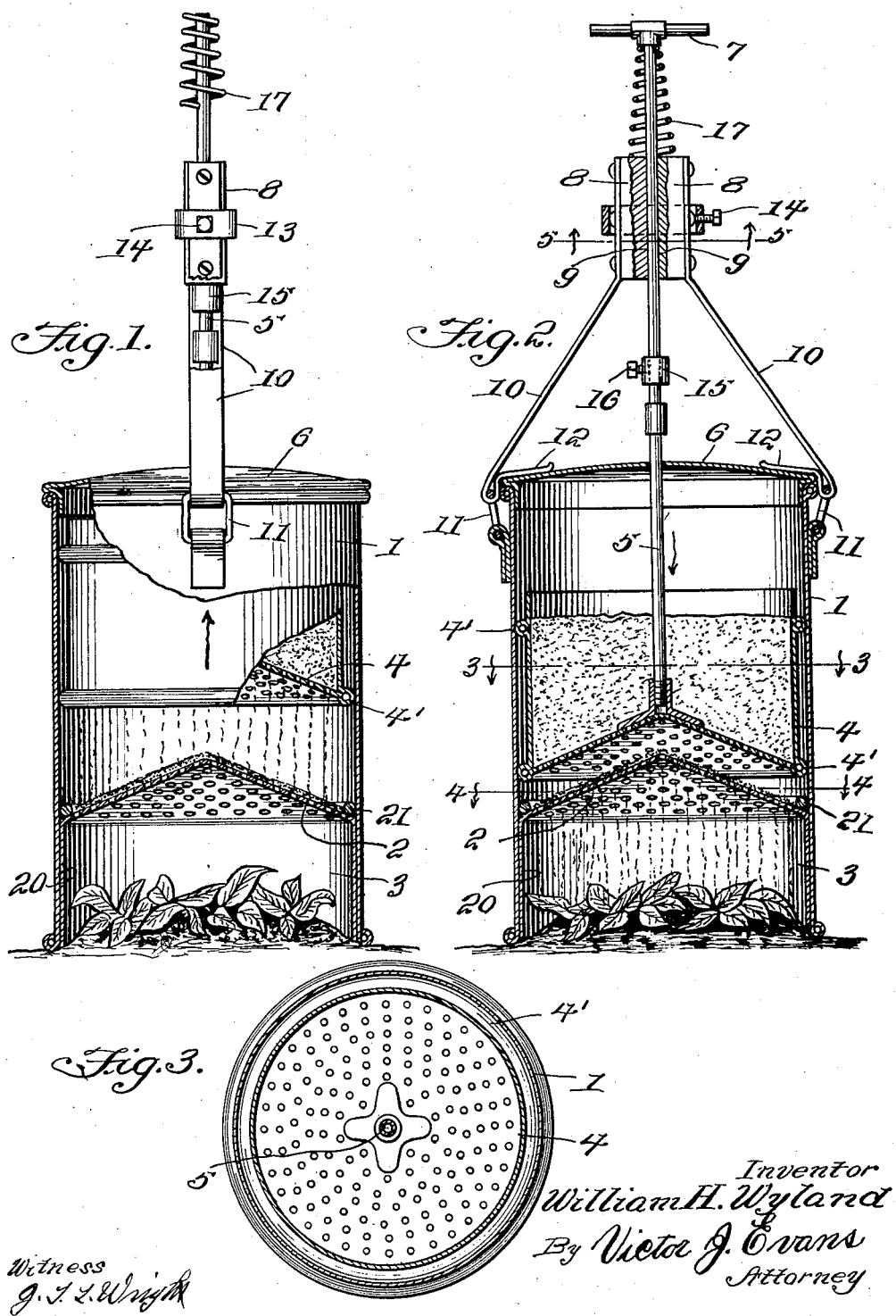

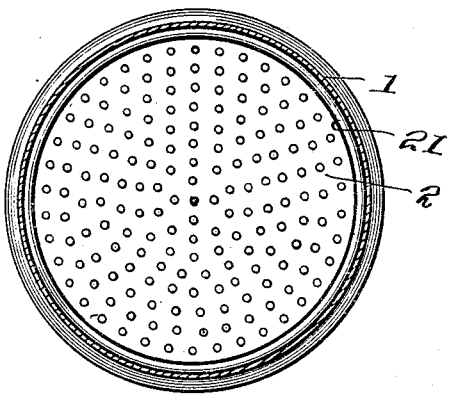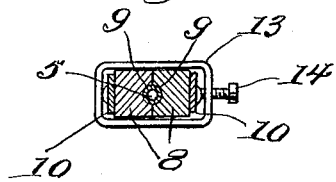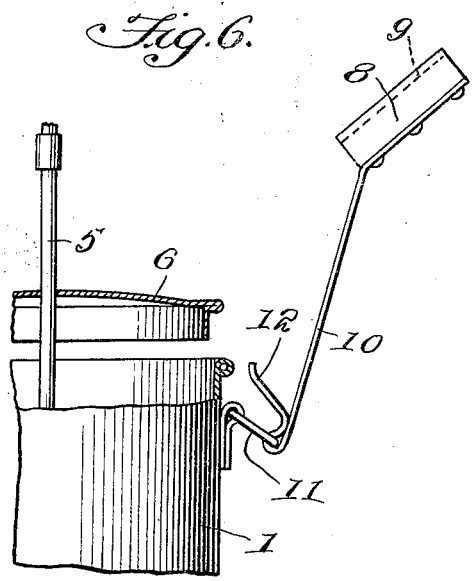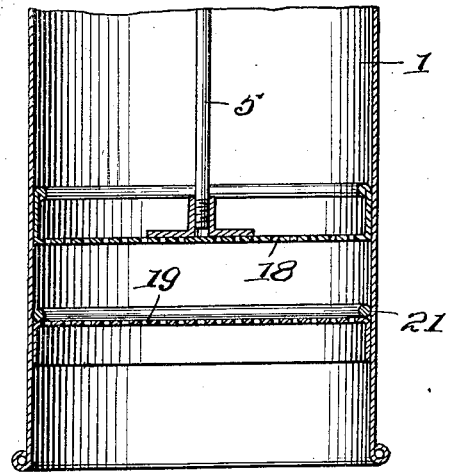

1,525,900

UNITED STATES PATENT OFFICE.

WILLIAM H. WYLAND, OF SIDNEY, OHIO.

SPRAYER.

Application filed February 4, 1924. Serial No. 690,630.

*To all whom it may concern:*

Be it known that I, WILLIAM H. WYLAND, a citizen of the United States, residing at Sidney, in the county of Shelby and State of Ohio, have invented new and useful Improvements in Sprayers, of which the following is a specification.

This invention relates to a device for powdering plants and the like, the general object of the invention being to provide a member adapted to encircle the hill of plants and provided with means for depositing a small quantity of insecticide powder upon them by the operation of a plunger carried by the member.

Another object of the invention is to provide means actuated by the plunger for creating a vacuum in the member which causes some of the powder to drop upon the stationary receiver and by the downward motion of the plunger, forces the powder that has dropped upon the receiver on through the receiver onto the plants.

A further object of the invention is to produce this vacuum by placing the dusting powder on the top of the plunger plate which is perforated so that when the device is placed on the ground and the plunger moved upwardly a vacuum will be formed under the plate so that some of the powder will drop through the perforations therein and fall upon the stationary plate. Then on the downward stroke this powder will pass through the perforations of the stationary plate upon the plants under the same.

A further object of the invention is to provide means for regulating the amount of powder discharged by the device.

This invention also consists in certain other features of construction and in the combination and arrangement of the several parts, to be hereinafter specifically described, illustrated in the accompanying drawings and set forth in the appended claims.

In describing my invention in detail, reference is to be had to the accompanying drawings wherein like characters denote like or corresponding parts throughout the several views, and in which:—

Figure 1 is a side view of the invention, with parts broken away and showing it in use over a hill of plants.

Figure 2 is an enlarged longitudinal sectional view through the device.

Figure 3 is a section on line 3—3 of Figure 2.

Figure 4 is a section on line 4—4 of Figure 2.

Figure 5 is a view on section line 5—5 of Figure 2.

Figure 6 is a fragmentary detail view showing how the cover is removable from the container.

Figure 7 is a sectional view showing a modification.

In these views, 1 indicates a container which is preferably of cylindrical shape and which has a perforated bottom 2 arranged therein an appreciable distance from its lower end so as to leave a space 3 for receiving the plants to be treated. A perforated piston 4 is arranged in the container and it is connected to the inner end of a rod 5 which passes through the cover 6 of the container and is provided with a handle 7 so that the rod can be reciprocated. The rod passes between a pair of blocks 8, each of which is provided with a semi-circular recess 9 to engage the rod and these blocks are carried by the spring strips 10 which have their lower ends passing through the loops 11 which are hinged to the top of the container and then the ends of the strips are carried upwardly and bent over to engage the cover 6, as shown at 12 to hold said cover in place. A rectangular clip 13 encircles the blocks 8 to hold them together and in engagement with the rod, the clip being detachably connected with the blocks by the set screw 14. A stop 15 is adjustably connected with the rod, below the blocks by the set screw 16 so that the movement of the piston rod and piston can be limited to the desired extent. A spring 17 is placed on the upper end of the piston rod to cushion its downward stroke. I prefer to make the bottom 2 and the piston 4 of cone-shape, as shown in the first form of the invention, though these parts can be made of flat shape, as shown at 18 and 19 in the second form of the device. I also prefer to make the bottom 2 with a flange 20 so that it can be fastened to the container. A ring 21 of wire is fastened to the interior of the container just above the bottom piece so as to prevent the piston from engaging the bottom and to leave a small space between the two parts when the piston is in its lowest position.

The powder used for killing the insects is placed in the piston and then the container is placed over the hill of plants to be treated. By drawing upwardly the piston rod, the piston will be moved upwardly and thus produce a partial vacuum in the lower part of the device which will cause some of the powder to drop through the holes in the piston upon the bottom piece and then when the piston is moved downwardly this powder will be forced through the holes in the bottom piece and dropped upon the plants. The powder in the piston will cover the holes therein so that when the piston is moved upwardly a vacuum will be produced between it and the bottom piece and thus draw some of the powder through the holes in the piston and this powder will drop upon the bottom piece. By adjusting the movement of the piston and its rod through the adjustable stop, the amount of powder deposited upon the plants can be controlled. By having the container surrounding the plants the device can be used on a windy day without waste of material. By having the spring strips 10 engaging the cover, a tight fit between the cover and container is formed to prevent escape of powder at this point. With this device, a man can treat from 1500 to 2500 hills of plants per day, and with the minimum amount of material.

The cylindrical part of the piston is preferably formed with one or more annular beads 4′ which frictionally engage the container and thus insure a partial vacuum being formed between the piston and the lower plate when the piston is raised.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a container having a perforated bottom located an appreciable distance from the end thereof so that the container can be placed over a hill of plants, a perforated piston in the container for receiving the powder and a piston rod connected with the piston for reciprocating the same.

2. A device of the class described comprising a container having a perforated bottom located a distance from the end of the container, a perforated piston in the container, a piston rod attached thereto and having a handle at its outer end, a cover for the container through which the rod passes and adjustable means for limiting the movement of the piston and piston rod.

3. A device of the class described comprising a container having a perforated bottom located a distance from the end of the container, a perforated piston in the container, a piston rod attached thereto and having a handle at its outer end, a cover for the container through which the rod passes, adjustable means for limiting the movement of the piston and piston rod, such means comprising a pair of blocks having recesses therein through which the rod passes, means for supporting the blocks, and an adjustable stop on the rod.

4. A device of the class described comprising a container having a perforated bottom arranged a distance from the lower end of the container, a perforated piston in the container, a piston rod connected therewith and having a handle at its outer end, a removable cover for the container through which the rod passes, spring strips hingedly connected with the container and having parts bearing on the cover, a block connected with the upper end of each strip and having a recess therein for engaging the rod, and clamping means for holding the blocks together, and an adjustable stop on the rod below the blocks.

In testimony whereof I affix my signature.

WILLIAM H. WYLAND.